(12) United States Patent
Nath

(10) Patent No.: US 7,698,336 B2
(45) Date of Patent: Apr. 13, 2010

(54) ASSOCIATING GEOGRAPHIC-RELATED INFORMATION WITH OBJECTS

(75) Inventor: Suman K. Nath, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 223 days.

(21) Appl. No.: 11/553,172

(22) Filed: Oct. 26, 2006

(65) Prior Publication Data

US 2008/0104019 A1 May 1, 2008

(51) Int. Cl.
G06F 17/30 (2006.01)
(52) U.S. Cl. .................. 707/737; 711/118; 711/147; 711/148; 711/149; 711/150
(58) Field of Classification Search .................. 711/100, 711/118, 129, 133, 141
See application file for complete search history.

(56) References Cited

U.S. PATENT DOCUMENTS

| | | | |
|---|---|---|---|
| 6,240,425 B1 | 5/2001 | Naughton | |
| 6,397,219 B2 | 5/2002 | Mills | |
| 6,487,495 B1 * | 11/2002 | Gale et al. .................. 701/209 | |
| 6,650,998 B1 | 11/2003 | Rutledge et al. | |
| 6,691,114 B1 | 2/2004 | Nakamura | |
| 6,701,307 B2 | 3/2004 | Himmelstein et al. | |
| 6,735,585 B1 | 5/2004 | Black et al. | |
| 6,789,102 B2 | 9/2004 | Gotou et al. | |
| 6,934,634 B1 | 8/2005 | Ge | |
| 6,993,718 B2 | 1/2006 | Fujihara | |
| 7,007,228 B1 | 2/2006 | Carro | |
| 7,054,741 B2 | 5/2006 | Harrison et al. | |
| 2003/0023586 A1 | 1/2003 | Knorr | |
| 2005/0228860 A1 | 10/2005 | Hamynen et al. | |
| 2005/0266856 A1 * | 12/2005 | Yamada et al. ............ 455/456.1 |
| 2006/0009240 A1 * | 1/2006 | Katz .......................... 455/457 |
| 2006/0111839 A1 * | 5/2006 | Han ........................... 701/213 |

FOREIGN PATENT DOCUMENTS

| | | |
|---|---|---|
| EP | 1160694 | 12/2001 |
| JP | 17092494 | 4/2005 |

OTHER PUBLICATIONS

PCT International Search Report dated Apr. 15, 2008 from correspondence PCT Application No. PCT/US2007/081404, filed Oct. 15, 2007, 3 pages.

(Continued)

*Primary Examiner*—Apu M Mofiz
*Assistant Examiner*—Anteneh Girma
(74) *Attorney, Agent, or Firm*—Lee & Hayes, PLLC

(57) ABSTRACT

Techniques for associating geographic-related information with objects are described. In one implementation, a search is conducted on a keyword string of one or more keywords descriptive or otherwise representative of a geographically-relevant object. If a location is identified, geographic-related semantic information of the location is associated with the geographically-relevant object. In some cases, multiple possible locations may be identified as a result of searching the keyword string. If multiple locations are identified, a probable location is determined and then geographic-related semantic information of the probable location is associated with the geographically-relevant object described by the keyword string.

18 Claims, 4 Drawing Sheets

OTHER PUBLICATIONS

Amitay, et al., "Web-a-Where: Geotagging Web Content", retrieved at <<http://einat.webir.org/SIGIR_2004_GeoMiner_p273-amitay.pdf#search=%22%22Web-a-where%3Ageotagging%20web%20content.%22%22>>, SIGIR'04, Jul. 25-29, 2004, ACM, 2004, pp. 273-280.

Chen, et al., "Efficient Query Processing in Geographic Web Search Engines", retrieved at <<http://cis.poly/edu/suel/papers/geoquery.pdf#search=%22%22Efficient%20Query%20Processing%20in%20Geographic%20Web%20Search%20Engines%22%22>>, SIGMOD2006, Jun. 27-29, 2006, ACM, 2006, pp. 12.

Silva, et al., "Adding Geographic Scopes to Web Resources", retrieved at <<http://xldb.di.fc.ul.pt/data/Publications_attach/grease.pdf>>, Faculdade de Ciencias da Universidade de Lishoa, Portugal, pp. 1-23.

Zhou, et al., "Hybrid Index Structures for Location-Based Web Search", retrieved at <<http://delivery.acm.org/10.1145/1100000/1099584/p155-zhou.pdf?key1=1099584&key2=6046098511&coll=GUIDE&dl=GUIDE&CFID=526951&CFTOKEN=42804252>>, CIKM'05, Oct. 31-Nov. 5, 2005, ACM, 2005, pp. 155-162.

* cited by examiner

US 7,698,336 B2

ASSOCIATING GEOGRAPHIC-RELATED INFORMATION WITH OBJECTS

BACKGROUND

Geographically centric web interfaces, such as Live Local ("local.live.com") from Microsoft Corporation and Google™ Maps ("maps.google.com") from Google, are useful to search for geographically relevant objects that represent physical places or things, such as restaurant, theatres, stores, parks, web cameras (webcams), traffic sensors, and so forth. To enable such searching, the objects are first matched to their precise locations in terms of latitude and longitude. Historically, the process is done manually and takes significant time and expense to match the objects with their locations.

As a result, there are many useful objects found on the Web that are not typically matched with their geographical locations. For example, a restaurant in the Redmond Town Center in Redmond, Wash. might position a webcam to capture the restaurant entry area. Images from the webcam may then be posted on the restaurant's webpage so that potential patrons may access the webcam online to quickly ascertain whether the restaurant is crowded. As another example, the Department of Transportation (DOT) of a city or state may publish traffic sensors on its website so that citizens can check traffic online before embarking on a drive. These objects of interests (e.g., the restaurant webcam and the traffic sensors) are not typically matched with geographically relevant information, like latitudes and longitudes. Rather, in most cases, the objects are simply made available on specific websites for users to access.

In some cases, the web pages might include a brief description of the objects. For instance, the restaurant webpage might show images from the webcam accompanied by a note "Redmond Town Center", while the DOT's webpage may provide a descriptive note (e.g., "I-5 and I-90 Interchange") next to the appropriate traffic sensor. While these objects are very useful and understandable in these contexts, a lack of specific geographical coordinates prevents them from being more widely used and displayed on maps by existing geo-centric web interfaces.

SUMMARY

Techniques for associating geographic-related information with objects are described. In one implementation, a search is conducted on a keyword string of one or more keywords descriptive or otherwise representative of a geographically-relevant object. If a location is identified, geographic-related semantic information of the location is associated with the geographically-relevant object. In some cases, multiple possible locations may be identified as a result of searching the keyword string. If multiple locations are identified, a probable location is determined and then geographic-related semantic information of the probable location is associated with the geographically-relevant object described by the keyword string.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical items.

DETAILED DESCRIPTION

This disclosure is directed to techniques for associating geographic-related information with objects available on the Web. In one use, these techniques make more objects available for presentation on geographically centric Web interfaces. Such interfaces are perhaps most commonly associated with mapping websites that provide mapping services such as driving directions, office locations, visuals of streets and buildings, and so on. Examples of such mapping websites include Live Local ("local.live.com") from Microsoft Corporation, Google™ Maps ("maps.google.com") from Google, and MapQuest ("mapquest.com") from MapQuest, Inc. However, there are many other instances where geographically centric Web interfaces are used including, for example, on traffic/transportation sites, travel sites, local entertainment sites, and so forth.

In other uses, associating geographic-related information with the objects allows for more intelligent handling of the objects for purposes of targeted advertising or delivery of additional information. Multiple and varied implementations are described below. In the following section, an exemplary environment that is suitable for practicing various implementations is discussed. After this discussion, representative implementations of systems and processes for implementing these techniques are described.

Exemplary Environment

Figure 1:
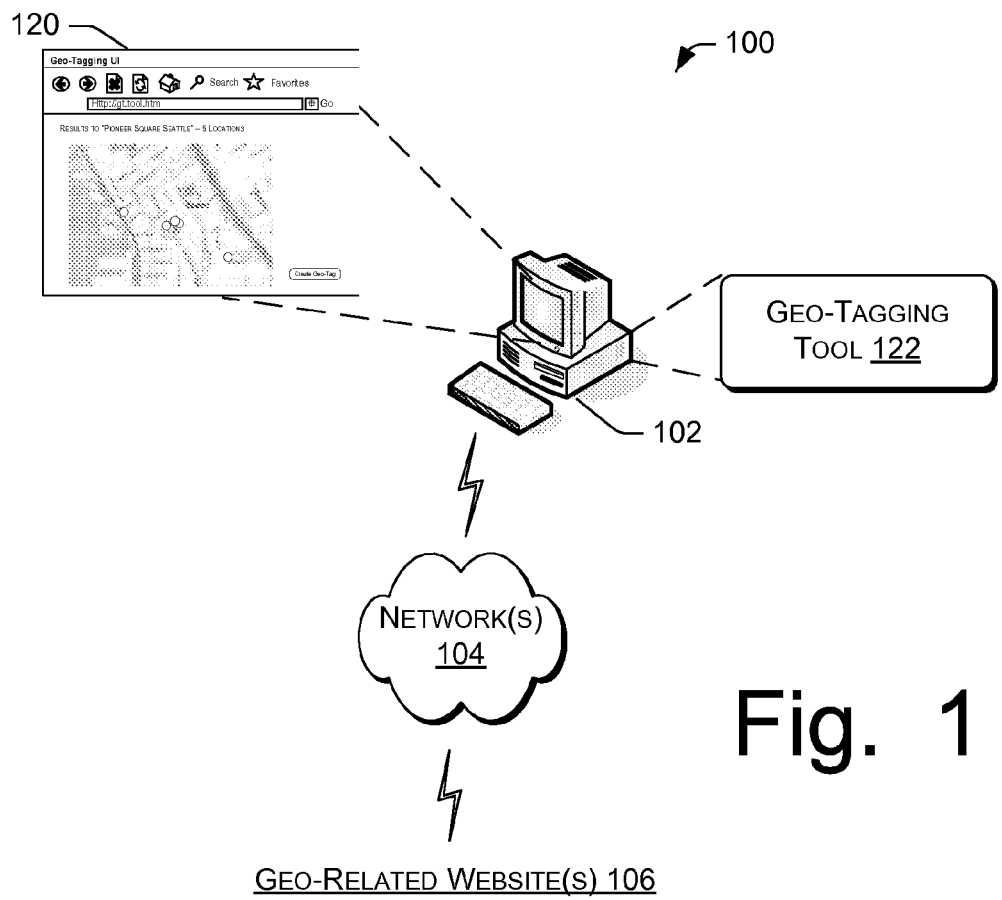
FIG. 1 illustrates an exemplary environment for implementing techniques to associate geographic-related information with geographically-relevant objects.
Figure 1:
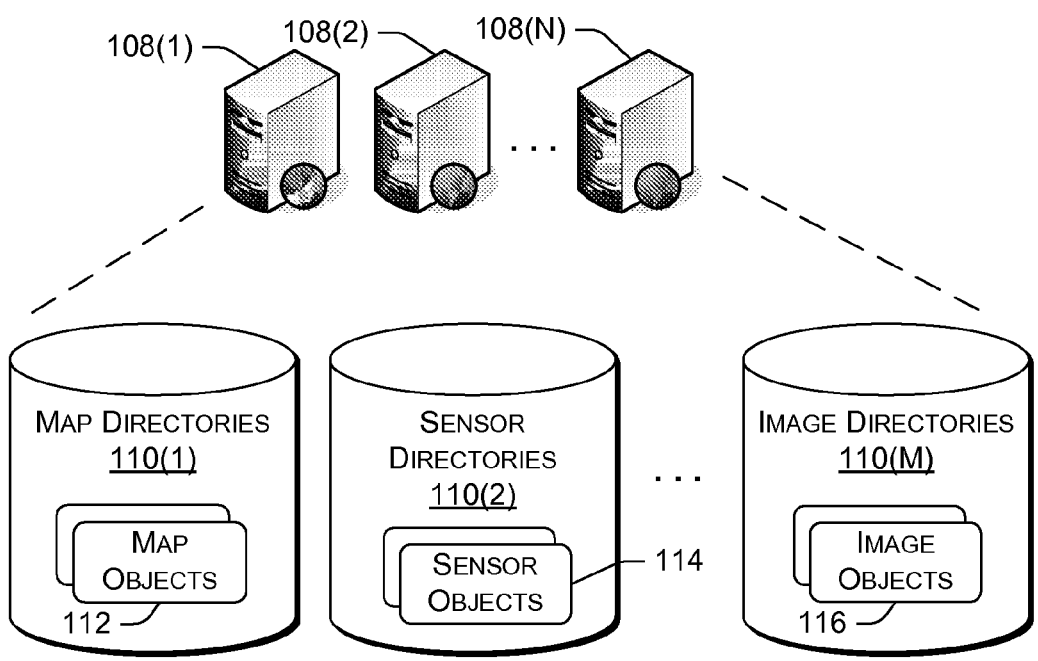

FIG. 1 shows an exemplary environment 100 for implementing techniques for associating geographic-related information with objects. For discussion purposes, environment 100 includes at least one computing device 102 that connects through a network 104 to access one or more websites 106. As illustrated, the websites are geographically related websites that might provide, for example, geographically centric (or "geo-centric") web interfaces.

The computing device 102 is configurable to access the websites over the network 104. Although illustrated as a desktop PC, the computing device 102 may be implemented as any of a variety of conventional computing devices including, for example, a server, a notebook or portable computer, a workstation, a mainframe computer, a mobile communication device, a PDA, an entertainment device, a set-top box, an Internet appliance, a game console, and so forth. The network 104 may be a wired network, a wireless network, or a combination thereof. The network 104 may further be a collection of individual networks, interconnected with each other and functioning as a single large network (e.g., the Internet or an intranet). Examples of such individual networks include, but are not limited to, Local Area Networks (LANs), Wide Area Networks (WANs), Metropolitan Area Networks (MANs), cellular networks, satellite networks, and cable networks.

The geographically related websites 106 are individually hosted on one or more servers, as represented by servers 108(1), 108(2), ..., 108(N). Each server may individually support a website, or alternatively, be arranged in a networked architecture to collectively support a website. The web servers 108 may be implemented in any number of ways including, for example, as a server farm, a mainframe computer, a data center, and so forth.

The geographically related websites 106 support geo-centric Web interfaces that may be served, for example, as web pages from servers 108(1)-108(N) over the network 104 to the client computing device 102. When generating a suitable interface, the servers may access various directories 110(1), 110(2), ..., 110(M) that list or store objects having geographical relevance. In the illustrated example, these directories may include map directories 110(1), sensor directories 110(2), and image directories 110(M). The map directories 110(1) list or store map-related objects 112 that represent physical elements, such as hills, trees, lakes, roads, intersections, railroad crossings, buildings, bridges, and so forth. The sensor directories 110(2) list or store sensor objects 114 that represent physical sensors, such as traffic cameras, web cameras (or "webcams"), temperature sensors, humidity sensors, wind speed sensors, and so on. The image directories 110(M) list or store image objects 116 associated with images captured in still or video form. Of particular interest are image objects having location relevance. Examples of such image objects might include images of a park bench or fountain in a particular park, famous buildings or facades, landmarks, signs or billboards, and so forth.

It is noted that the illustrated objects are merely representative and not intended to be exhaustive. Many other types of objects may be used including, for example, documents, articles, audio files, and so on.

The web pages retrieved from the websites 106 are rendered on the client device 102 via a rendering program, such as a browser. The rendered web page provides a geo-centric interface containing one or more objects to be located geographically. In FIG. 1, an example web page 120 depicting a map of downtown Seattle is rendered on the client device 102.

The client device 102 further executes a geo-tagging tool 122 to tag objects with geographic-related information. More particularly, the geo-tagging tool 122 provides a way to automatically associate semantic information with objects so that those objects may be located on maps or other geo-centric interfaces. The tool 122 allows a user to enter one or more keywords representing a possible object into the web interface and then search geo-centric websites to obtain possible locations for that object. The locations are identified by coordinates, such as latitude and longitude. The possible locations may be depicted on a two dimensional map for the user to view and/or temporarily held in memory. The geo-tagging tool 122 then computes a probable location of the object as a function of these possible locations.

Once a single location is ascertained, the tool 122 associates geographic-related semantic information about the location with that object. This information may be embodied in the form of a tag assigned to the object. Tags are a type of metadata that associates descriptors with objects. Tags may be freely defined by their creator or chosen to conform to a folksonomy. The tagged object may then be stored so that the geographic-related semantic information remains associated with the object.

Accordingly, the geo-tagging tool 122 essentially facilitates automatic labeling of objects available on the Web (e.g., images, cameras, sensors, documents, etc.) with corresponding geographic information (e.g., latitude and longitude). Once labeled, the objects can be displayed on maps or can be searched efficiently given a specific location.

Although the geo-tagging tool 122 is illustrated as residing on a client device 102 separate from the websites 106, it is noted that in other implementations the tool 122 may reside elsewhere. For instance, the tool 122 may be implemented at one of website servers 108, or on a computer (not shown) associated with the website so that the site operators can tag relevant objects.

It is further noted that although the techniques are described above in the context of geo-centric web interfaces, the techniques may be implemented in other environments as well. For instance, the techniques may be implemented in the context of systems configured to provide additional information or provide targeted relevant advertising. For instance, in another implementation, the geo-tagging tool 122 may be adopted for use with text entry applications (e.g., a word processing program) so that when a use enters a text string, the tool can infer the location of an object associated with the text string. Once a location is ascertained, a system might deliver additional information to the user about the object described by the text string or perhaps serve targeted advertisements to users who are interested in the object or its location.

Exemplary System

Figure 2:
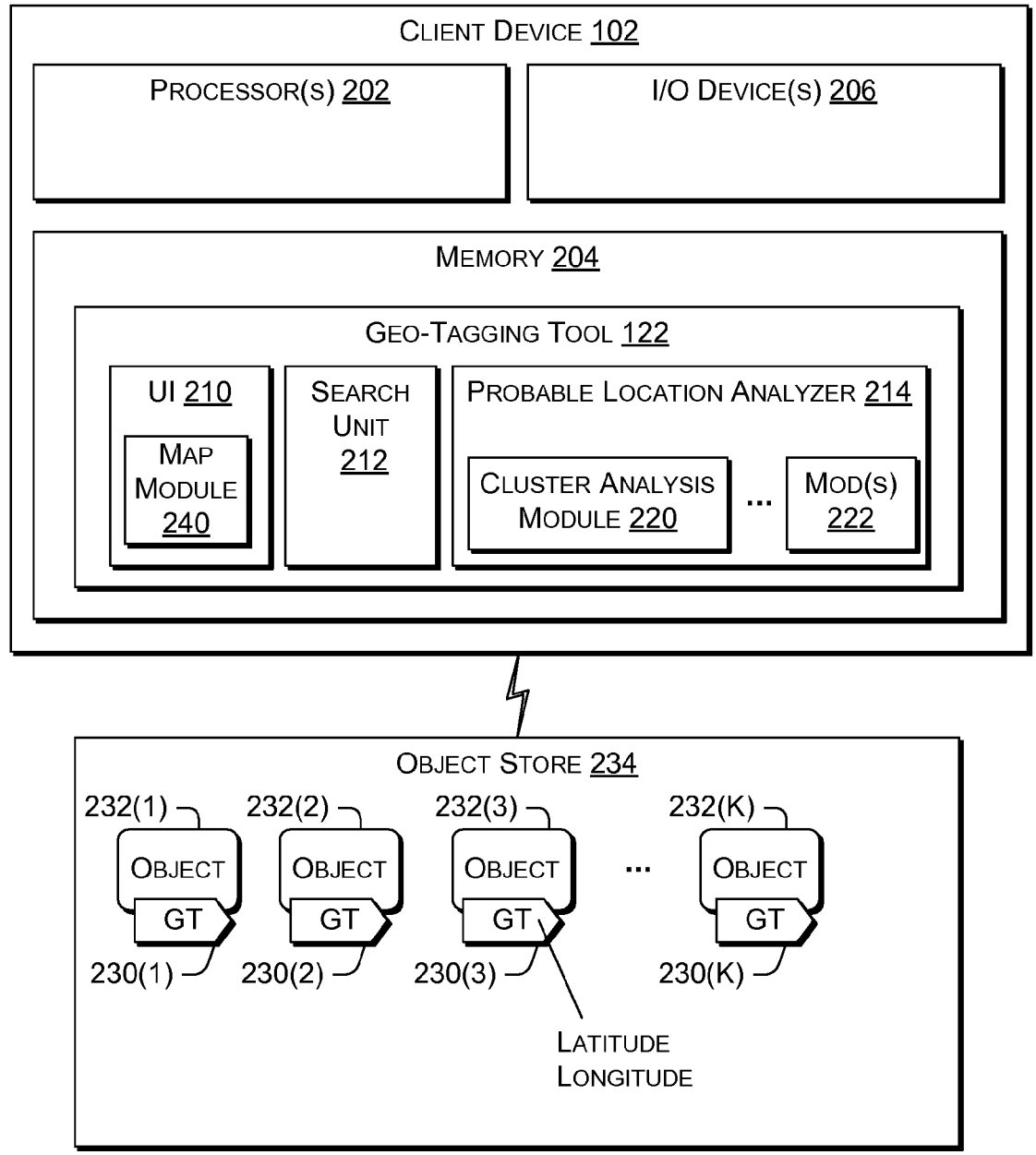
FIG. 2 is a block diagram of a computing device and a tool executable on the computing device to tag geographically-relevant objects with geographic-related information.

FIG. 2 illustrates various components of an exemplary computing device 102 suitable for implementing the geo-tagging tool 122. The computing device 102 can include, but is not limited to, one or more processors 202, a memory 204, Input/Output (I/O) devices 206 (e.g., keyboard and mouse), and a system bus (not shown) that operatively couples various components including processor(s) 202 to memory 204. The system bus represents any of the several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, a Peripheral Component Interconnects (PCI) bus also known as a Mezzanine bus, a PCI Express bus, a Universal Serial Bus (USB), a Secure Digital (SD) bus, or an IEEE 1394 (i.e., FireWire) bus.

Memory 204 includes computer-readable media in the form of volatile memory, such as Random Access Memory (RAM) and/or non-volatile memory, such as Read Only Memory (ROM) or flash RAM. Memory 204 typically includes data and/or program modules for implementing the geo-tagging tool that are immediately accessible to and/or presently operated on by processor(s) 202.

In one implementation, a geo-tagging tool 122 is stored in the memory 204 and executable on the processor(s) 202. The tool 122 includes a user interface (UI) 210 that allows a user to enter a keyword string of one or more words representing an object. The keywords may be any words selected that might be useful to identify or describe the object. For example, a traffic camera located on the I-5 and I-90 interchange in Seattle may be identified on the Washington State Department of Transportation (WSDOT) website ("wsdot.wa.gov") as "I-5/I-90 Interchange". This whole text can be entered as the keyword string for this particular camera.

Figure 3:
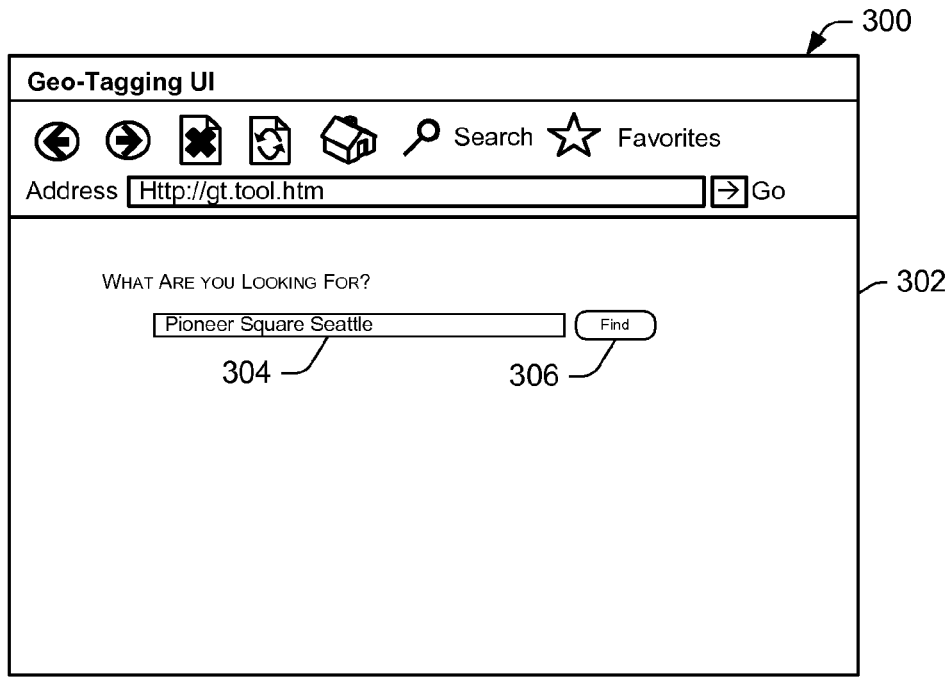
FIGS. 3 and 4 illustrate example screen renderings of a user interface provided by the tool in FIG. 2.

FIG. 3 shows an example screen rendering 300 generated by the UI 210. The screen rendering 300 represents an initial screen in which the user can enter the keyword string. In this initial screen, an entry pane 302 includes an invitation or instructions (e.g., "What are you looking for?") to enter a keyword string. The entry pane 302 includes an entry field 304 into which the user may enter the keyword string. In this example, the user enters the phrase "Pioneer Square Seattle". A button, icon, or other actuatable element 306 (e.g., the "Find" button) may be provided to allow the user to initiate a search of that keyword string, although pressing an "enter" key on the keyboard or other techniques may also be used to initiate the search.

While the screen rendering 300 is illustrated in the context of a browser user interface, it is noted that in other implementations the tool UI 210 may be part of or integrated into a different type of interface. For instance, the tool UI 210 may be part of a software application that creates maps or other geographical charts, or alternatively as part of a word processing program or other text entry applications.

With reference again to FIG. 2, the geo-tagging tool 122 may also include a search unit 212 to conduct or direct a search of geo-related websites 106 based on the keyword string. The search unit 212 may be a search engine that conducts the searching. Alternatively, the unit 212 may simply be an interface to a remote search engine that performs the searching. As one example, the search unit 212 and UI 210 may be implemented via an interface rendered by a browser that allows a user to enter a keyword string and then initiate a search of the geo-related websites 106 using search engines at those sites.

The search unit 212 hopes to identify at least one location associated with the keyword string. However, the search may return void or with one or more possible locations. For example, in response to the keyword string "I-5/I-90 Interchange" or "Pioneer Square Seattle", the search results may return a zero, one, or multiple real physical locations around the interchange or around the square. The latter case where multiple locations are returned may arise if the keywords are not sufficiently specific for the search engine to return only a single result. Such objects may not lend themselves to detailed descriptions, and hence multiple locations may in fact fit the "fuzzy" descriptors.

If the search returns one location, geographic-related semantic information for that one location is presumed to be accurate and hence the information is associated with the object described by the keyword string. This information includes the latitude and longitude of the location.

When multiple locations are returned, the geo-tagging tool 122 analyzes the results and settles on a single location to associate with the object. The location may be one of the results, or it may be a probable location computed based on the multiple results. In one implementation, the geo-tagging tool 214 employs a probable location analyzer 214 that determines a probable location of the object described by the keyword string. The probable location analyzer 214 may utilize one or more statistical models to determine the probable location, as represented by modules 220 and 222.

As one example, a cluster analysis module 220 computes a probable location from multiple possible locations using a clustering technique. According to this technique, the module 220 plots or otherwise represents the possible locations on a two-dimensional space (e.g., a map) in terms of latitude and longitude. For example, suppose a search on the keyword string "Pioneer Square Seattle" for a webcam positioned near a public park in Pioneer Square district of Seattle returns five possible locations. These five locations are then represented in two-dimensional space.

Figure 4:
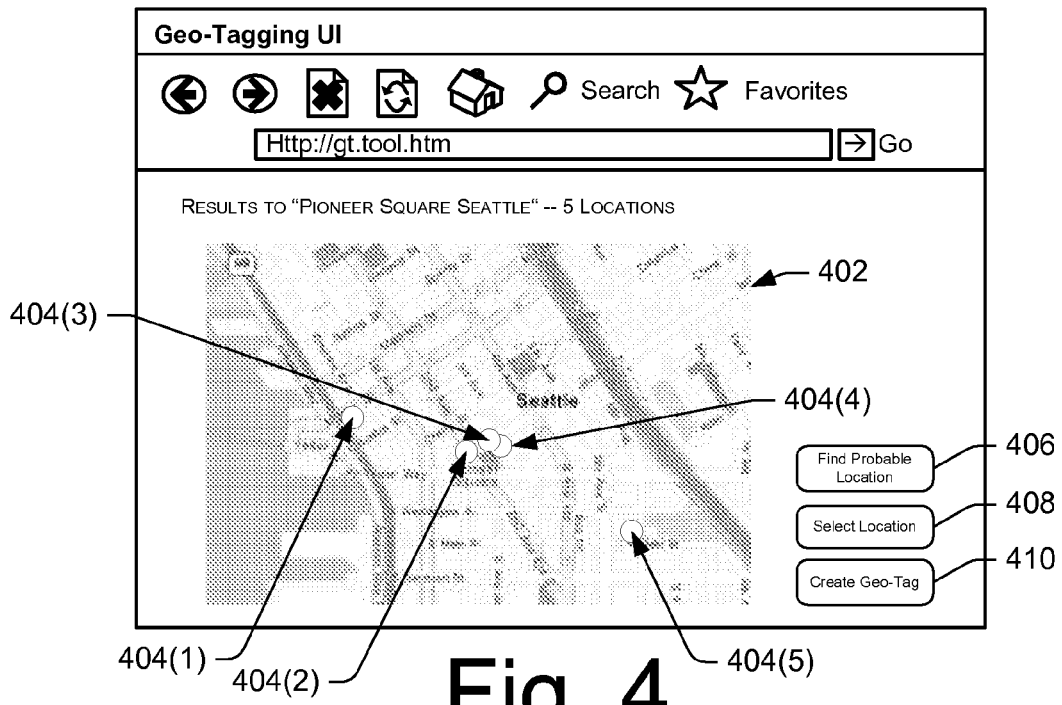

FIG. 4 shows an example screen rendering 400 that may be generated, for example, by the UI 210 to represent a two-dimensional space with the possible locations plotted thereon. In this illustration, the screen rendering 400 shows a two-dimensional map 402 of downtown Seattle including the Pioneer Square area of the city. The five possible locations are represented by circular elements 404(1)-404(5). Three of the possible locations 404(2), 404(3), and 404(4) are bunched together, while the other two possible locations 404(1) and 404(5) are spread out.

After seeing the results, the user may decide to have a probable location computed based on the results. The user may initiate this process, for example, but actuating a button or other element 406 (e.g., "Find Probable Location") on the UI in FIG. 4. In response, the cluster analysis module 220 computes a likely location from all possible locations returned by the search. In one implementation, the module 220 computes this initial center point as a function that minimizes the sum of the square distances from the initial center to the possible locations 404(1)-404(5). Once the initial center is found, the cluster analysis module 220 computes the mean and standard deviation of the distances from the initial center to all possible locations 404(1)-404(5). The module 220 then removes spurious locations by eliminating any location that is farther than two standard deviations away from the mean. In the example illustrated in FIG. 4, outlying locations 404(1) and 404(5) may be eliminated as being more than two standard deviations away from the mean. Thereafter, a final center is computed for the remaining locations, once again by minimizing the sum of the square distances from the final center to the locations. Thus, with reference to FIG. 4, the final center is found as a function of the three remaining, tightly clustered locations 404(2)-404(4). This final center is then returned as the single location for the object described by the keyword string.

It is noted that the above implementation represents just one example clustering technique. It is noted that other clustering techniques may be employed. Further, in another implementation, the user may elect to choose a probable location rather than compute one based on a clustering analysis. In this case, the user may select or highlight one of the circular elements 404(1)-404(5) and then confirm this selection by clicking on the button or element 408 (e.g., a "Select Location" button). In this matter, the location is selected without having any statistical computations.

It is further noted that the representation shown in FIG. 4 may not actually be depicted on the client computing device. Rather, this representation may be merely informative for this discussion to illustrate how the cluster analysis is performed. Thus, in one possible implementation, the tool may automatically find a probable location whenever multiple possible locations are returned, without ever showing these possible locations on a user interface. Thus, in certain implementations, the tool can effectively automate the entire process such that a single location for an object can be determined without any user interaction. For example, for an object, the tool can automatically query geocentric websites, return several results with different geographic-related information (e.g., different latitudes and longitudes), and compute a probable location from all of the results, all without user interaction. Indeed, the user may not even know the existence of the multiple possible locations returned by geo-centric websites. In certain implementations, the user may only see the final computed probable location rendered by the UI 210.

After the geo-tagging tool 122 finds a location for the object described in the keyword string, the tool 122 associates geographic-related semantic information of the location with the object. In one implementation, the tool 122 assigns a tag containing at least the latitude and longitude of the location to the object. This association or assignment may occur automatically once a single location is identified, or it may be initiated in response to user input, such as by clicking a button or icon 410 (e.g., the "Create Geo-Tag" button) on the UI.

As shown in FIG. 2, geographical tags or "geo-tags" (GT) 230(1), 230(2), . . . , 230(K) are assigned to the objects 232(1), 232(2), . . . , 232(K). The resulting tagged objects are stored in an object store 234. The objects 232 represent map objects 112, sensor objects 114, image objects 116, or essentially any object that may be represented on a map or is otherwise geographically relevant in some manner. Each geographical tag 230 includes semantic information that defines the position of the physical element represented by the object, in terms of geographical coordinates such as latitude and longitude.

In FIG. 2, the object store 234 is shown residing separately from the client device 102. In this manner, the tagged objects may be stored on different machines than those used to execute the geo-tagging tool 122. However, in other implementations, the store 234 may reside on the same computing device 102 as the geo-tagging tool 122.

To illustrate another possible use of the geo-tagging techniques, the tool 122 may further include a mapping module 240 (shown as part of the UI 210) that uses the resulting tagged objects to help center maps according to a viewpoint based on the user entered keywords. That is, the mapping module 240 presents the results from a search of geo-centric web search engines on a map such that the approximate location of the object described by the keyword string is at the center. For instance, in response to the user entering "Pioneer Square Seattle" as the keyword string, the resulting map can be presented with Pioneer Square at the center.

Generally, program modules executed on the components of computing device 102 include routines, programs, objects, components, data structures, etc., for performing particular tasks or implementing particular abstract data types. These program modules and the like may be executed as a native code or may be downloaded and executed such as in a virtual machine or other just-in-time compilation execution environments. Typically, the functionality of the program modules may be combined or distributed as desired in various implementations.

An implementation of these modules and techniques may be stored on or transmitted across some form of computer-readable media. Computer-readable media can be any available media that can be accessed by a computer. By way of example, and not limitation, computer-readable media may comprise computer storage media that includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium, which can be used to store the desired information and which can be accessed by a computer.

Exemplary Processes

Figure 5:
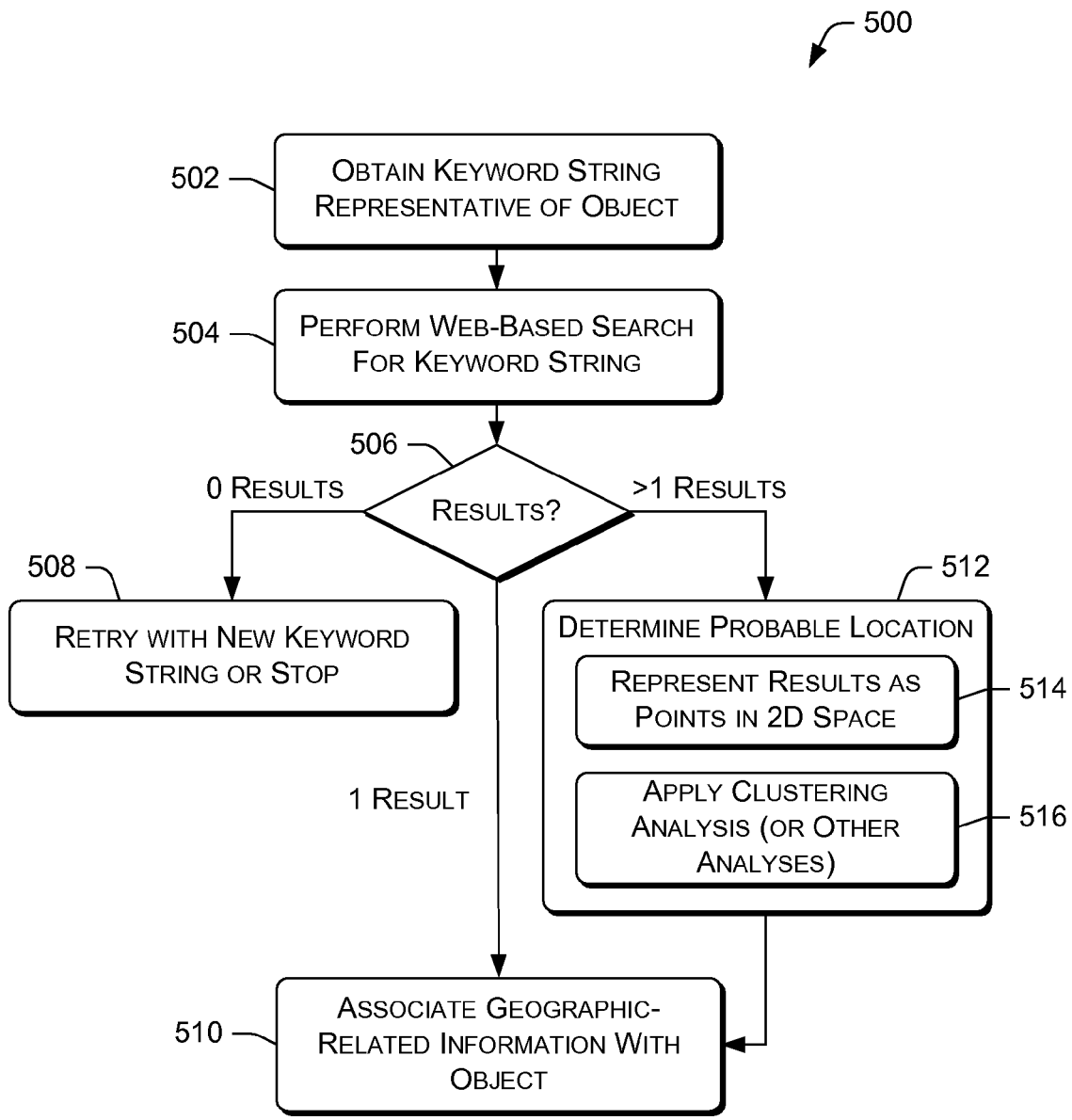
FIG. 5 is a flow diagram of an exemplary process for associating geographic-related information with geographically-relevant objects.

FIG. 5 illustrates an exemplary process 500 for associating geographic-related information with geographically-relevant objects. The process 500 is illustrated as a collection of blocks in a logical flow graph, which represents a sequence of operations that can be implemented in hardware, software, or a combination thereof. In the context of software, the blocks represent computer instructions that, when executed by one or more processors, perform the recited operations. For discussion purposes, the process 500 is described with reference to environment 100 shown in FIG. 1 and computing device 102 shown in FIG. 2.

At 502, a keyword string representative of a geographically-relevant object is obtained. The keyword string may consist of one or more keywords. The keywords may be arranged in a phrase or as a simple collection of terms. The keywords may be entered by a user or automatically extracted from text related to the object, such as text found on a webpage describing a webcam. For example, the WSDOT traffic webcam on I-5/I-405 intersection is labeled as "Seattle Area Traffic I-5/I-405 Interchange (Alderwood)". This entire text can be used as the keywords for this particular camera.

At 504, a web-based search is performed on the keyword string. More specifically, in certain implementations, the search is conducted on geo-centric web search engines such as Live Local ("local.live.com") from Microsoft Corporation and Google™ Maps ("maps.google.com") from Google. These geocentric search engines generally tag results with corresponding geographical information such as latitude and longitude. However, any search engine that provides such geographical information in its results may be employed.

At 506, it is determined how many results are returned from the search. In this implementation, there are three options depending on how many results are returned by the search engine. If no results are returned (i.e., the "0 Results" branch from 506), the search was unable to find a location suitable for the keyword string. Thus, at 508, the process may be restarted with a new keyword string or halted.

If one result is returned (i.e., the "1 Result" branch from 506), the location is presumed to be accurate for the object. Thus, at 510, the geographic-related information for that single location is associated with the object described by the keyword string. This geographic-related information includes the latitude and longitude of the location, and may include other types of data or semantic information.

If multiple results are returned (i.e., the ">1 Results" branch from 506), a probable location for the object is determined at 512. This probable location may be ascertained in several ways, including through use of computational techniques or alternatively, via user selection of a particular location from the multiple possible locations returned in the search.

In one implementation, a clustering technique is employed to compute a probable location. At 514, the possible locations returned in the results are represented as points in two-dimensional space. For instance, the possible locations may be plotted on a map, such as that shown in FIG. 4. At 516, a clustering analysis is applied to the points. In one implementation, a set of tightly-clustered points is identified by removing outlying points. Then, a center for the tightly-clustered set is computed. In other implementations, different analyses may be employed to ascertain a probable location for the object.

Once the probable location is determined, the geographic-related information of the probable location is associated with the object described in the keyword string at 510. Once again, this information includes coordinate data, such as latitude and longitude. The association may be accomplished by storing the information in conjunction with the object, or assigning a tag to the object, or through other means.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method, comprising:

receiving a keyword string of one or more keywords, the keyword string being representative of a geographically-relevant object available on the Web, wherein the geographically-relevant object is an object selected from a group of objects, the group of objects comprising map objects, image objects, and sensor objects;

searching geographical data, available on the Web, to identify locations associated with the keyword string;

determining a probable location based on the identified locations;

associating geographic-related semantic information descriptors of the probable location with the geographically-relevant object by assigning a metadata tag derived from the keyword string to the geographically-relevant object, wherein the metadata tag associates the descriptors with the geographically-relevant object and wherein the associating comprises determining a probable location as a clustering function of the multiple locations;

correlating the geographic-related semantic information of the probable location with the geographically-relevant object, wherein the cluster function for computing the probable location from the multiple locations comprises:

computing an initial center point as a statistical function that minimizes a sum of the square distances from the initial center point to each one of the multiple locations;

removing spurious locations located greater than a predefined distance from a mean of the multiple locations; and computing the probable location for remaining ones of the multiple locations by minimizing a sum of the square distances from the probable location to each one of the remaining ones of the multiple locations; and storing the geographically-relevant object and the metadata tag to allow a web search engine to locate the geographically-relevant object and the metadata tag responsive to a query.

2. The method as recited in claim 1, wherein the geographic-related semantic information comprises latitude and longitude.

3. The method as recited in claim 1, wherein the tag further comprises co-ordinates of the at least one location.

4. The method as recited in claim 1, further comprising correlating the geographic-related semantic information of the probable location with the geographically-relevant object.

5. The method as recited in claim 1, wherein the storing stores the associated geographic-related semantic information descriptors together with the geographically-relevant object.

6. The method as recited in claim 1, further comprising presenting a map such that the location with the geographically-relevant object is centered.

7. A computer readable storage medium storing computer-executable instructions that, when executed by a processor coupled to the computer readable medium cause the processor to perform acts comprising:

initiating a Web search of geographical data to identify possible locations associated with a keyword string, the keyword string comprising one or more keywords representative of a geographically-relevant object, wherein the geographically-relevant object is an object selected from a group of objects, the group of objects comprising map objects, image objects, and sensor objects;

determining a probable location as a function of the possible locations and associating geographically-related semantic information descriptors of the probable location with the geographic-relevant object, by assigning a metadata tag derived from the keyword string to the geographically-relevant object wherein the metadata tag associates the descriptors with the geographically-relevant object;

correlating the geographic-related semantic information of the probable location with the geographically-relevant object, wherein the cluster function for computing the probable location from the multiple locations comprises:

computing an initial center point as a statistical function that minimizes a sum of the square distances from the initial center point to each one of the multiple locations;

removing spurious locations located greater than a predefined distance from a mean of the multiple locations; and computing the probable location for remaining ones of the multiple locations by minimizing a sum of the square distances from the probable location to each one of the remaining ones of the multiple locations; and storing the geographically-relevant object and the metadata tag to allow a web search engine to locate the geographically-relevant object and the metadata tag responsive to a query.

8. The computer readable storage medium as recited in claim 7, wherein the geographic-related semantic information comprises latitude and longitude.

9. The computer readable storage medium as recited in claim 7, further storing computer-executable instructions that, when executed, perform acts comprising assigning the tag to include co-ordinates of at least one of the possible locations and the probable location.

10. The computer readable storage medium as recited in claim 7, further storing computer-executable instructions that, when executed, perform acts comprising storing the associated geographic-related semantic information together with the geographically-relevant object.

11. The computer readable storage medium as recited in claim 7, further storing computer-executable instructions that, when executed, perform acts comprising presenting a map such that the geographically-relevant object is centered.

12. One or more processor-accessible storage media comprising processor-executable instructions that, when executed, direct a device to provide an interface comprising:

an entry area to permit entry of a keyword string of one or more keywords, the keyword string being representative of a geographically-relevant object, wherein the geographically-relevant object is an object selected from a group of objects, the group of objects comprising map objects, image objects, and sensor objects;

a module to identify, via the Web, geographical locations associated with the keyword string and to associate geographic-related information of the geographical location with the geographically-relevant object, by assigning a metadata tag derived from the keyword string to the geographically-relevant object wherein the metadata tag associates geographic-related information descriptors with the geographically-relevant object; and a correlating module, wherein the correlating module that correlates the geographic-related semantic information of the probable location with the geographically-relevant object, wherein the cluster function for computing a probable location from the multiple locations comprises:

computing an initial center point as a statistical function that minimizes a sum of the square distances from the initial center point to each one of the multiple locations;

removing spurious locations located greater than a predefined distance from a mean of the multiple locations; and computing the probable location for remaining ones of the multiple locations by minimizing a sum of the square distances from the probable location to each one of the remaining ones of the multiple locations.

13. The interface as recited in claim 12, wherein the geographic-related information comprises latitude and longitude.

14. The interface as recited in claim 12, wherein the module assigns the tag to include co-ordinates of the at least one geographical location.

15. The interface as recited in claim 12, wherein the module further comprising an analysis unit to determine a probable location from the multiple possible locations and associate the geographic-related semantic information of the probable location to the geographically-relevant object.

16. The interface as recited in claim 12, further comprising a mapping module to present a map with the geographically-relevant object at center.

17. The method as recited in claim 1, further comprising sending targeted relevant advertising information to a sender of the keyword string, the targeted relevant advertising information being relevant to at least one of the locations and to the keyword string.

18. The method as recited in claim 1, wherein the determination of the probable location is selectable to be performed automatically and manually.

* * * * *

UNITED STATES PATENT AND TRADEMARK OFFICE
CERTIFICATE OF CORRECTION

PATENT NO. : 7,698,336 B2
APPLICATION NO. : 11/553172
DATED : April 13, 2010
INVENTOR(S) : Suman K. Nath It is certified that error appears in the above-identified patent and that said Letters Patent is hereby corrected as shown below:

In column 9, line 43, in Claim 1, delete "web" and insert -- Web --, therefor.

Signed and Sealed this
Twenty-fifth Day of January, 2011

David J. Kappos
*Director of the United States Patent and Trademark Office*